United States Patent [19]
Eichmann

[11] Patent Number: 5,704,754
[45] Date of Patent: Jan. 6, 1998

[54] CAN END FABRICATING SYSTEM INCLUDING AN IMPROVED CONVEYOR BELT DRUM

[76] Inventor: Harry Eichmann, 8228 Inspiration Dr., Merrimac, Wis. 53561

[21] Appl. No.: 421,186

[22] Filed: Apr. 13, 1995

[51] Int. Cl.⁶ .................................................. B65G 15/58
[52] U.S. Cl. .............................. 413/56; 198/834; 413/66
[58] Field of Search ............................ 413/56, 62, 66, 413/67; 198/803.15, 834

[56] References Cited

U.S. PATENT DOCUMENTS

| | | | |
|---|---|---|---|
| 3,859,865 | 1/1975 | Conrad | 198/834 |
| 4,072,062 | 2/1978 | Morling | 198/834 |
| 4,568,230 | 2/1986 | Brown . | |
| 4,568,320 | 2/1986 | Tangorra | 198/834 |
| 4,640,116 | 2/1987 | Brown | 413/62 |
| 4,723,882 | 2/1988 | Wissman et al. . | |
| 4,846,774 | 7/1989 | Bell | 413/66 |
| 4,904,140 | 2/1990 | Herdzina | 413/56 |
| 4,946,028 | 8/1990 | Eichmann et al. . | |
| 5,017,072 | 5/1991 | Herdzina | 413/66 |
| 5,142,769 | 9/1992 | Gold | 413/56 |
| 5,158,410 | 10/1992 | Hunt . | |
| 5,259,496 | 11/1993 | Common | 413/66 |

*Primary Examiner*—Kurt Rowan
*Attorney, Agent, or Firm*—Foley & Lardner

[57] ABSTRACT

An improved can end transfer belt drive assembly includes a drum, drive teeth and belt support rings. The assembly also includes a support shaft rotatably supported by bearings within an associated can end press. The drum is fastened to the shaft and includes a cylindrical surface located at a first radius from the rotational axis of the shaft. The support rings are supported by the cylindrical surface in a side-by-side spaced relationship to rotate relative to the drum, and the teeth are fastened to the drum between the rings. This belt drive assembly supports a transfer belt including drive holes, and the assembly transfers the force to move the belt from the teeth to the drive holes without transferring substantial force as a result of friction between the drum and the belt.

24 Claims, 4 Drawing Sheets

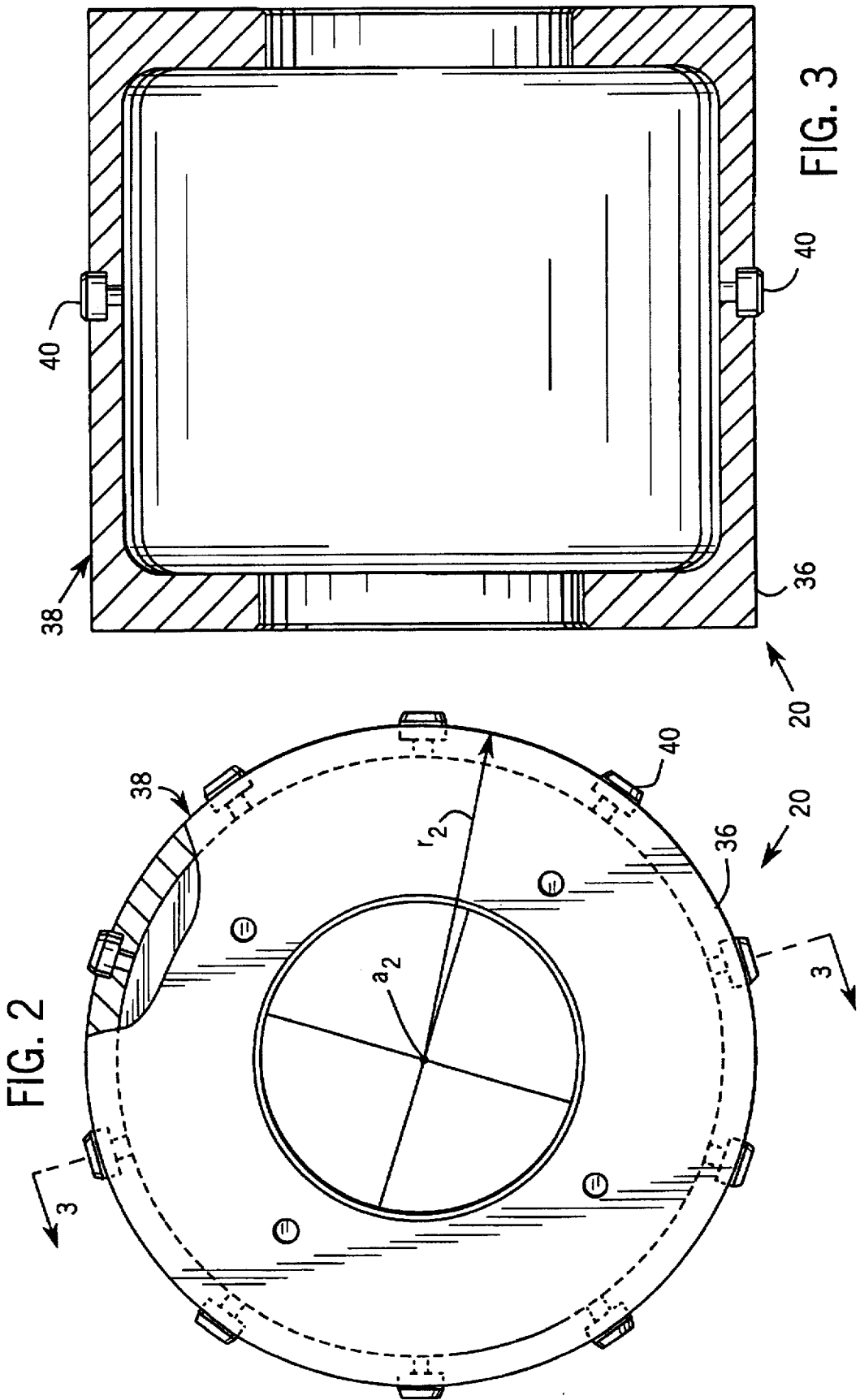

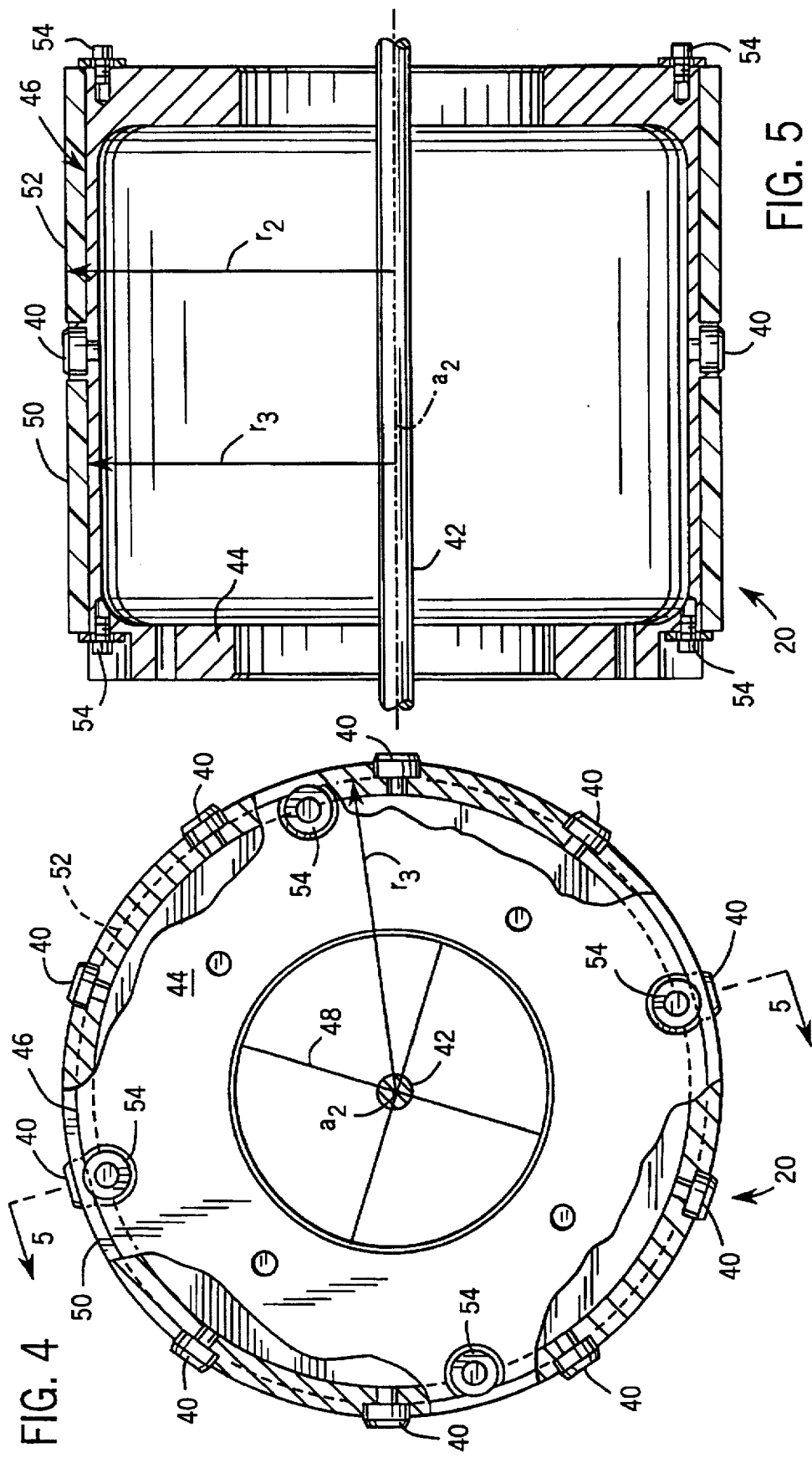

CAN END FABRICATING SYSTEM INCLUDING AN IMPROVED CONVEYOR BELT DRUM

FIELD OF THE INVENTION

The present invention relates to systems for fabricating the tops of aluminum cans. In particular, the present invention relates to an improved drive drum for supporting and moving a can end conveyor belt.

BACKGROUND OF THE INVENTION

The top ends of beverage (e.g. beer and soda) cans are formed in high volumes using presses such as those disclosed in U.S. Pat. No. 4,568,230, issued to Omar L. Brown on Feb. 4, 1986, and U.S. Pat. No. 4,723,882, issued to Wissman et al. on Feb. 9, 1988. In general, these presses include a main press having tooling for forming can ends and a continuous, can end transfer belt extending therethrough to carry can end blanks from a supply of blanks, support the can ends during stamping, and transfer the can ends away from the stamping station. The transfer belts are typically fabricated from a material such as stainless steel and include carrier openings. (U.S. Pat. No. 4,946,028, issued to Eichmann et al. on Aug. 7, 1990, and U.S. Pat. No. 5,158,410, issued to George D. Hunt on Oct. 27, 1992, disclose such transfer belts.)

The transfer belts are typically supported between two drums. One of the drums is an idler drum and the other drum is a drive drum including drive teeth. The drive drum is rotated by an appropriate drive train and motor, and the teeth of the drum cooperate with carrier openings in the transfer belt to index the belt and associated can ends through the press.

One reason for using metal transfer belts is to maintain tight tolerances while stamping can ends. Furthermore, to maintain tight tolerances, it is also important that the drive teeth and carrier openings are closely matched so that accurate control of the drive motor will result in precise indexing of the transfer belt. The importance of accuracy resulted in the use of drive teeth and carrier openings rather than just the friction force between the transfer belts and the drive drum. However, as a result of operation, the frictional force between the drive drums and drive belts acts to wear the carrier openings and/or the drive teeth. This wear is a result of the drive teeth exerting high forces against the carrier openings to slide the belt against the friction force when the teeth and openings become misaligned during operation. As a result of wear of the teeth and/or openings, the accuracy of belt indexing decreases until the belt must be discarded. In the case of many can end presses belts are discarded on a weekly basis.

In view of the problems discussed above, it would be desirable to provide and improved transfer belt drive mechanism which reduces the wear between the drive teeth and the associated carrier openings of the belt.

SUMMARY OF THE INVENTION

The present invention provides a belt drive assembly for use in a can end press of the type including at least one can-end forming station, and a continuous belt including a plurality of can end supports and a plurality of drive teeth openings. The assembly includes a drive shaft having a rotational axis, a first cylindrical surface supported by a bearing to rotate relative to the drive shaft at a predetermined radius from the rotational axis, and plurality of drive teeth. The drive teeth are fastened to the drive shaft to extend outwardly beyond the first cylindrical surface. The continuous belt is supported by the drive belt assembly to contact the first cylindrical surface with at least one of the drive teeth being located within one of the drive teeth openings.

The present invention also provides a can end press including at least one can-end forming station supported by a frame, a first drum including a first cylindrical surface located at a first radius from a first rotational axis, and a continuous belt including a plurality of can end supports and a plurality of drive teeth openings. The first drum is rotatably supported about the first rotational axis by the frame. The press also includes a belt drive assembly having a drive shaft rotatably supported about a second rotational axis by the frame, a second cylindrical surface supported by a bearing to rotate relative to the drive shaft at a second radius from the second rotational axis, and a plurality of drive teeth fastened to the drive shaft to extend outwardly beyond the second cylindrical surface. The belt is supported by the drum and the drive belt assembly, and the belt contacts the first and second cylindrical surfaces so that at least one of the drive teeth is located within one of the drive teeth openings.

In another configuration of the press, the belt drive assembly includes a drive shaft rotatably supported about a second rotational axis by the frame, a second cylindrical surface supported by a first bearing to rotate relative to the drive shaft at a second radius from the second rotational axis, a third cylindrical surface supported by a second bearing to rotate relative to the drive shaft at the second radius from the second rotational axis, and a plurality of drive teeth fastened to the drive shaft to extend outwardly between and beyond the second and third cylindrical surfaces.

BRIEF DESCRIPTION OF THE DRAWINGS

FIG. 2 is a side view of a conventional transfer belt drive drum;

FIG. 3 is a sectional view of the drive drum of FIG. 2 taken along line 3—3;

FIG. 4 is a side view of a transfer belt drive drum in accordance with the present invention; and FIG. 5 is a sectional view of the drive drum of FIG. 4 taken along line 5—5.

DETAILED DESCRIPTION OF THE PREFERRED EMBODIMENT

Figure 1:
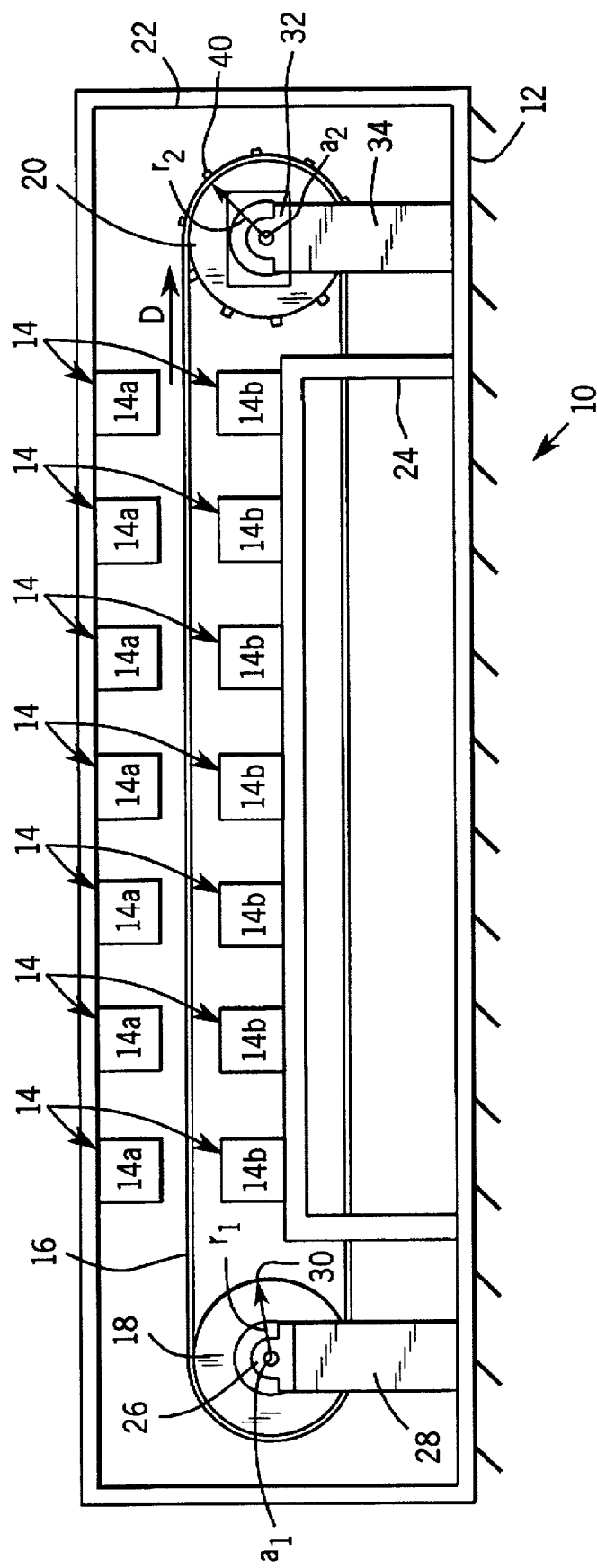
FIG. 1 is a schematic side view of a can end press including a transfer belt.

Referring to FIG. 1, a schematic representation of a can end press 10 includes a frame 12, a plurality of stamping stations 14, a continuous can end transfer belt 16, a belt support drum 18, and a belt drive assembly 20. Each station 14 may include an operating portion 14a and a belt and can end support portion 14b. Portions 14a are supported by upper support frame 22, and portions 14b are supported by lower support frame 24. Frames 22 and 24 are fixed to and part of the main support frame 12. Belt support drum 18 is rotatably supported by bearings 26, which are supported by bearing supports 28 fastened to frame 12. More specifically, drum 18 includes a cylindrical surface 30 located at a radius r1 from the rotational axis defined by bearings 26.

Belt drive assembly 20 is rotatably supported by a positioner 32 and the corresponding bearings thereof (not shown). Positioner 32 and the associated bearing rotatably support assembly 20 about an axis a2, and positioner 32 and the associated bearings are supported by support 34 so that axes a1 and a2 are substantially parallel. By way of example only, positioner 32 may include an appropriate gear drive and electric motor mechanically connected to a shaft including a longitudinal axis which is coincident with axis a2 for rotatably supporting assembly 20.

Turning now to the general operation of can end press 10, each station 14 may produce one progressive stamping operation on a can end. For example, beginning with a can end located at the leftmost station 14, this station operates as a bubble station. The electric motor of positioner 32 is then stepped to move the can end one station over, wherein the can end button is formed, the motor of positioner 32 is then stepped to move the can end to the third station over, wherein further features of the can end are press formed, and in a similar manner, the electric motor of positioner 32 is controlled to move the can end from station 14 to station 14 until the completed can end is delivered to the rightmost end of the machine by transfer belt 16. (Of course, positioner 32 may be located on either end of press 10.)

By way of example, transfer belt 16 may be a continuous metallic belt which is supported on the surfaces of drum 18 and assembly 20, wherein drive assembly 20 rotates to move belt 16 in the direction D past stations 14. By way of specific example, belt 16 may be the type of belt disclosed in detail in U.S. Pat. No. 4,946,028, issued to Eichmann et al. on Aug. 7, 1990. The complete disclosure of the '028 U.S. Pat. No. is incorporated herein by reference.

Figure 1A:
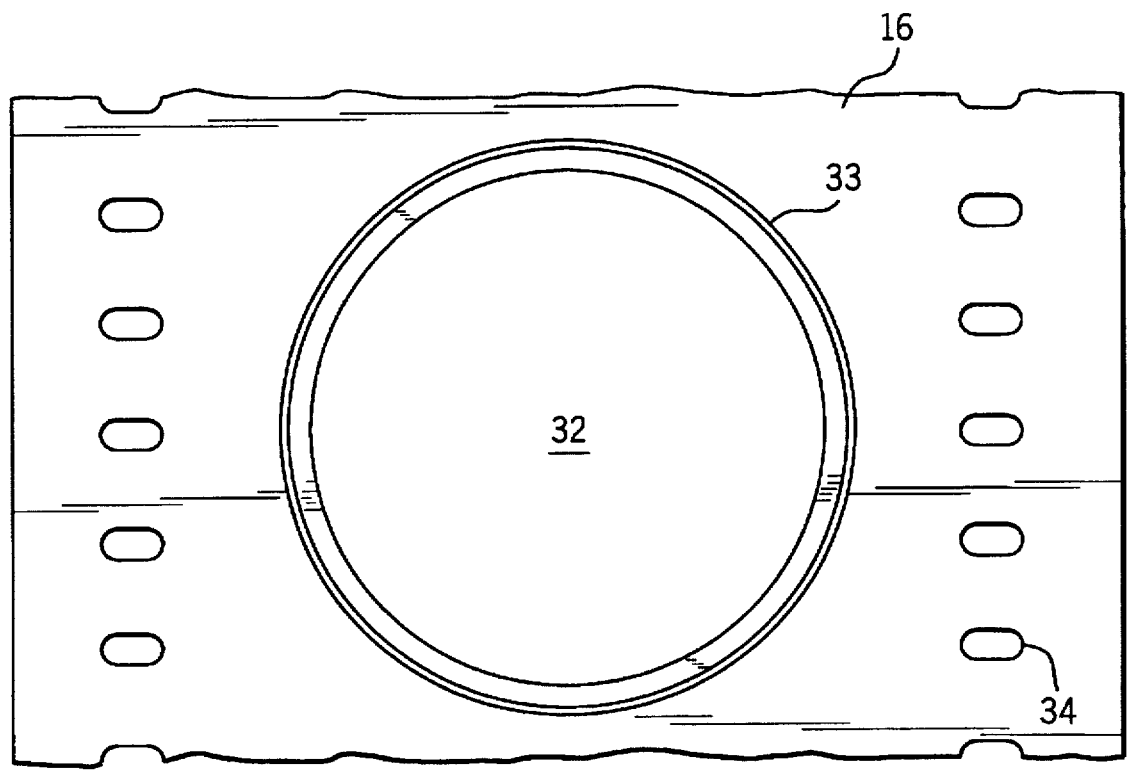
FIG. 1A is a top view of the transfer belt of FIG. 1.

As shown by FIG. 1A, belt 16 includes an aperture 32, a groove 33 and a plurality of drive pin or teeth openings 34. Aperture 32 is sized for receiving a can end support. Groove 33 prevents inadvertent rotation of the can end support. Drive teeth openings 34 extend through belt 16 and receive drive teeth 40.

Turning now to FIGS. 2 and 3, a drive belt assembly 20 includes a drive drum 36 having a cylindrical surface 38 located at a radius r2 from the rotational axis a2 thereof. Drum 36 also includes a plurality of drive teeth or pins 40 which cooperate with associated drive pin or teeth openings within transfer belt 16. Pins 40 cooperate with the drive teeth openings in belt 16 so that positioner 32 can accurately step belt 16 and the associated can ends to successive stations 14. However, this conventional embodiment of assembly 20 may produce excessive wear in belt 16 and the drive teeth openings thereof. Accordingly, the positioning accuracy of positioner 32 reduces as belt 16 is worn, and the can ends produced by press 10 are either of poor quality or unusable.

Turning to FIGS. 4 and 5, the present embodiment of a drive belt assembly 20 according to the present invention includes a drive shaft 42 mechanically coupled to positioner 32 for rotation about its longitudinal axis which is coincident with rotational axis a2. Assembly 20 also includes a drum portion 44 which includes a bearing surface 46 at a first radius r3 from axis a2. Drum portion 44 is mechanically fixed to shaft 42 by a spider assembly 48 so that bearing surface 46 rotates at a constant radius about axis a2. Assembly 20 also includes a pair of slip rings 50 and 52 slidably supported upon surface 46 as illustrated in FIGS. 4 and 5. Slip rings 50 and 52 include an outside surface having the radius r2 from axis a2. Drive pins 40 are fixed to drum 44 and are located between slip rings 50 and 52. Retaining washer and bolt assemblies 54 are engaged with drum portion 44, as shown in FIGS. 4 and 5, to hold slip rings 50 and 52 onto drum 44. The inside surface of rings 50 and 52 cooperate with bearing surface 46 to provide a bearing between rings 50 and 52 and shaft 42 so that rings 50 and 52 may rotate relative to shaft 42 while the outside surfaces 50 and 52 remain at radius r2 from axis a2.

In operation, belt 16 contacts the outside surfaces of rings 50 and 52 so that assembly 20 supports belt 16 within press 10. However, unlike the drive assembly of FIGS. 2 and 3, the force to move belt 16 is not transmitted from shaft 42 to belt 16 as a result of the friction force between belt 16 and the outside surface of rings 50 and 52 because rings 50 and 52 can rotate freely relative to drum 44. Accordingly, substantially all of the force required to move belt 16 is applied from pins 40 to the pin openings of belt 16. Furthermore, by eliminating the transfer of drive force from drum 44 to belt 16, the drive forces between drum 44 and pins 40 do not interact to wear out the pin openings in belt 16.

By way of example only, rings 50 and 52 may be fabricated from a plastic such as Teflon and used with or without a lubricant between the inside surface thereof and the bearing surface of drum 44. Furthermore, belt 16 has generally the same can end aperture structure as disclosed in U.S. Pat. No. 4,946,028, but as will be obvious to one skilled in the art, the drive pin configuration of the belt disclosed in the '029 patent would be reconfigured to include the drive pin openings along the center of the belt, rather than along the sides of the belt.

The preferred embodiment of the present invention has been disclosed by way of example and it will be understood that other modifications may occur to those skilled in the art without departing from the scope and spirit of the appended claims. By way of specific example, assembly 20 illustrated in FIGS. 4 and 5 could be modified to eliminate drum 44, and drive pins 40 could be supported directly by a structure such as a spider fastened to shaft 42. Additionally, rings 50 and 52 would be replaced with corresponding drums including a belt support surface and rotatably supported upon shaft 42 by appropriate bearings (e.g., so that the belt support surface may freely move relative to shaft 42 at a radius r2 from rotational axis a2). Additionally, depending upon the type of belt and can end press associated therewith, the drive pin opening configuration of belt 16 and the drive pin 40 configuration on assembly 20 may be modified to accommodate the particular belt and press 10.

What is claimed is:

1. A can end press comprising:

a support frame;

at least one can-end forming station supported by the frame;

a first drum including a first cylindrical surface located at a first radius from a first rotational axis, the first drum being rotatably supported about the first rotational axis by the frame;

a belt drive assembly including a drive shaft rotatably supported about a second rotational axis by the frame, a second cylindrical surface supported by a bearing to rotate independent of the drive shaft at a second radius from the second rotational axis, and a plurality of drive teeth fastened to the drive shaft to extend outwardly beyond the second cylindrical surface, the first and second rotational axes being parallel; and a continuous belt including a plurality of can end supports and a plurality of drive teeth openings, the belt being supported by the drum and the drive belt assembly, wherein the belt contacts the first and second cylindrical surfaces and at least one of the drive teeth is located within one of the drive teeth openings.

2. The press of claim 1, wherein the bearing includes:

a cylindrical ring having an inside cylindrical surface and the second cylindrical surface is located on an outside surface thereof; and a second drum fixed to the drive shaft and including an outside cylindrical surface, wherein the cylindrical ring slidably engages the outside cylindrical surface to enable the second cylindrical surface to rotate independent of the drive shaft.

3. The press of claim 2, wherein the cylindrical ring is formed from a plastic.

4. The press of claim 2, wherein the cylindrical ring is formed from teflon.

5. The press of claim 2, wherein the plurality of drive teeth are fastened to the drive shaft by the second drum.

6. The press of claim 1, wherein the continuous belt is a metal belt.

7. The press of claim 6, wherein each can end support is located at a respective aperture in the belt.

8. The press of claim 5, wherein the continuous belt is a metal belt.

9. The press of claim 8, wherein each can end support is located at a respective aperture in the belt.

10. In a can end press of the type including at least one can-end forming station, and a continuous belt including a plurality of can end supports and a plurality of drive teeth openings, a belt drive assembly comprising:

a drive shaft including a rotational axis;

a first cylindrical surface supported by a bearing to rotate independent of the drive shaft at a predetermined radius from the rotational axis; and a plurality of drive teeth fastened to the drive shaft to extend outwardly beyond the first cylindrical surface, wherein the continuous belt is supported by the drive belt assembly to contact the first cylindrical surface with at least one of the drive teeth being located within one of the drive teeth openings.

11. The belt drive assembly of claim 10, wherein the bearing includes:

a cylindrical ring having an inside cylindrical surface and the first cylindrical surface is located on an outside surface thereof; and a second drum fixed to the drive shaft and including an outside cylindrical surface, wherein the second cylindrical ring slidably engages the outside cylindrical surface to enable the second cylindrical surface to rotate independent of the drive shaft.

12. The belt drive assembly of claim 11, wherein the cylindrical ring is formed from teflon.

13. The belt drive assembly of claim 11, wherein the plurality of drive teeth are fastened to the drive shaft by the drum.

14. A can end press comprising:

a support frame;

at least one can-end forming station supported by the frame;

a first drum including a first cylindrical surface located at a first radius from a first rotational axis, the first drum being rotatably supported about the first rotational axis by the frame;

a belt drive assembly including a drive shaft rotatably supported about a second rotational axis by the frame, a second cylindrical surface supported by a first bearing to rotate independent of the drive shaft at a second radius from the second rotational axis, a third cylindrical surface supported by a second bearing to rotate independent of the drive shaft at the second radius from the second rotational axis, and a plurality of drive teeth fastened to the drive shaft to extend outwardly between and beyond the second and third cylindrical surfaces, the first and second rotational axis being parallel; and a continuous belt including a plurality of can end supports and a plurality of drive teeth openings, the belt being supported by the drum and the drive belt assembly, wherein the belt contacts the first, second and third cylindrical surfaces and at least one of the drive teeth is located within one of the drive teeth openings.

15. The press of claim 14, wherein the first and second bearings include:

a first cylindrical ring having a first inside cylindrical surface and the second cylindrical surface is located on the outside surface thereof;

a second cylindrical ring having a second inside cylindrical surface and the third cylindrical surface is located on an outside surface thereof; and a second drum fixed to the drive shaft and including an outside cylindrical surface, wherein the inside cylindrical surfaces of the cylindrical rings slidably engage the outside cylindrical surface to enable the second and third cylindrical surfaces to rotate independent of the drive shaft.

16. The press of claim 15, wherein the cylindrical rings are formed from teflon.

17. The press of claim 15, wherein the plurality of drive teeth are fastened to the drive shaft by the second drum.

18. The press of claim 14, wherein the continuous belt is a metal belt.

19. The press of claim 18, wherein each can end support is located at a respective aperture in the belt.

20. The press of claim 17, wherein the continuous belt is a metal belt.

21. A belt drive assembly for driving a continuous belt having a plurality of drive teeth openings, the belt drive assembly comprising:

a drive shaft;

a belt support surface rotably supported above the drive shaft so as to rotate independent of the drive shaft; and a plurality of drive teeth fixedly coupled to the drive shaft and extending outwardly from the drive shaft beyond the support surface for being received within corresponding drive teeth openings of the belt.

22. The belt drive assembly of claim 21 including:

a drum fixedly coupled to the drive shaft about the drive shaft and including an outer cylindrical surface, wherein the support surface includes an inner cylindrical surface slidably engaging the outer cylindrical surface to rotatably support the support surface independent of the drive shaft.

23. The belt drive assembly of claim 20 including:

a second support surface coupled to the frame so as to rotate independent of the drive shaft, wherein the second support surface supports the belt.

24. The belt drive assembly of claim 23 including:

a drum having an outer cylindrical surface fixedly coupled to the drive shaft about the drive shaft, wherein the second support surface includes an inner cylindrical surface slidably engaging the outer cylindrical surface to rotate the second support surface independent of the drive shaft.

* * * * *